May 29, 1962 A. H. SHARAWAY 3,036,722
MARKET CART
Filed July 21, 1959 2 Sheets-Sheet 1
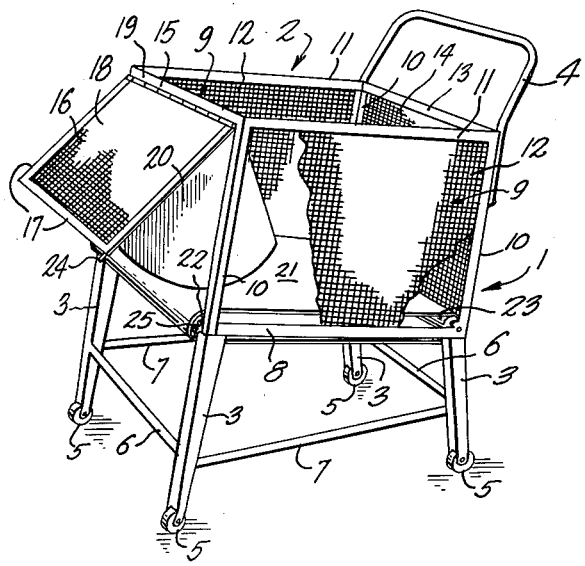
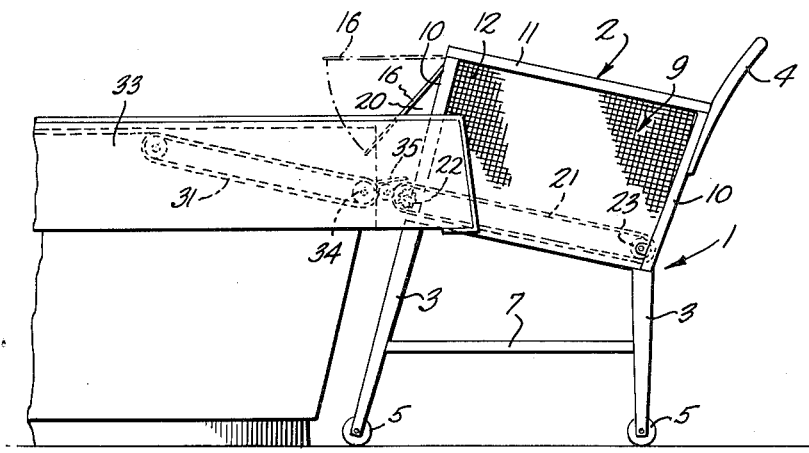
INVENTOR
Alan H. Sharaway
BY Mason, Fenwick & Lawrence
ATTORNEYS May 29, 1962     A. H. SHARAWAY     3,036,722
MARKET CART
Filed July 21, 1959     2 Sheets-Sheet 2
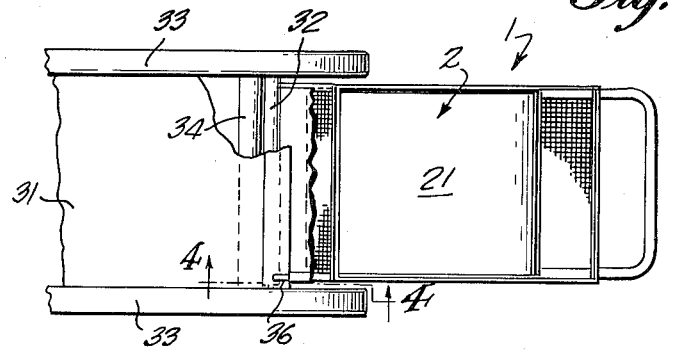
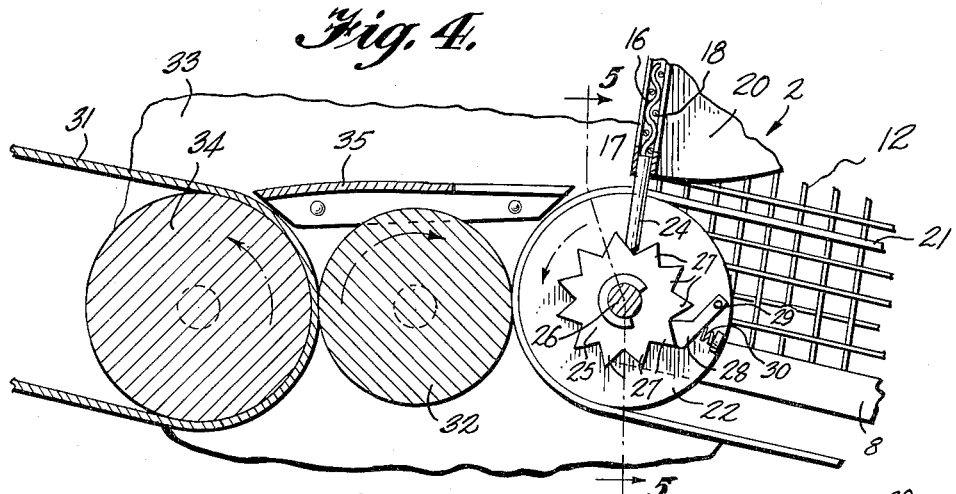
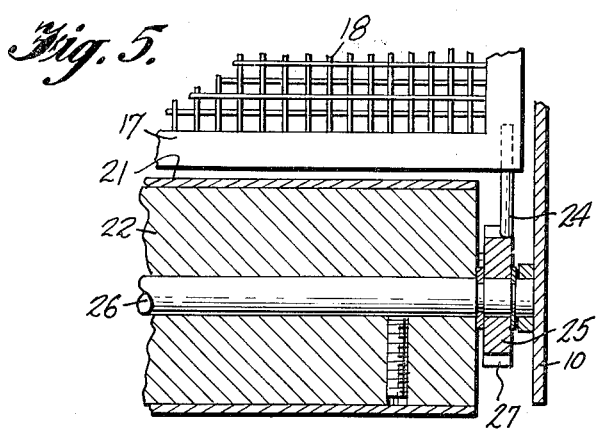
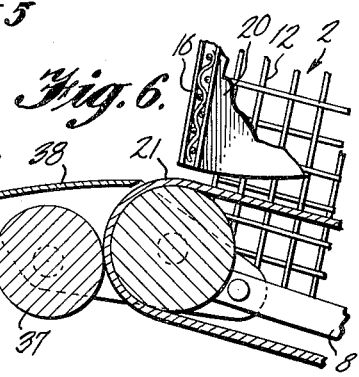
INVENTOR
Alan H. Sharaway
BY Mason, Fenwick & Lawrence
ATTORNEYS

United States Patent Office 3,036,722
Patented May 29, 1962

3,036,722
MARKET CART
Alan H. Sharaway, Alexander City, Ala.
(P.O. Box 252, Goodwater, Ala.)
Filed July 21, 1959, Ser. No. 828,537
3 Claims. (Cl. 214—83.36)

This invention relates to grocery carts of the type used by customers in self-service stores, and particularly to such carts adapted for use in stores having belt-type, automatic checkout counters.

The use of small, wheeled basket carts as receptacles and transporting means for groceries in self-service stores has become quite prevalent. Customers take carts from a supply near the store entrance, and push the carts along as they travel through the store. Groceries from the shelves are deposited in the carts as each customer makes his selection. When a customer has completed his purchases, he pushes the cart to the checkout counter. The customer, the checker, or another attendant will lift the groceries from the cart onto the checkout counter where they are checked and bagged.

With the advent of the automatic checkout counter, much of the heavy work of the checker was eliminated, as the counter mechanism automatically moves the groceries from a deposit point to the checker, and from the checker to a bagging station. The manual transferral of the groceries from the cart to the counter still has to be made, however, as each customer reaches the checkout counter.

The object of the present Invention is to provide a grocery cart capable of automatic unloading to transfer goods from the cart to a checkout counter.

Another object is to provide such a cart which will be capable of automatic unloading when placed in operative association with an automatic checkout counter by utilizing the checkout counter as a motive force for operation of the cart.

A further object is the provision of a grocery cart of this type which will hold the goods placed therein against accidental spilling until actually unlocked for release of the goods by actual operative contact with a checkout counter.

Other objects of the invention will become apparent from the following description of practical embodiments thereof, when taken in conjunction with the drawings which accompany, and form part of, this specification.

In the drawings:

FIGURE 1 is a perspective view of a grocery cart embodying the principles of the present invention;

FIGURE 2 is a side view of the cart shown in operative unloading position against the end of an automatic checkout counter;

FIGURE 3 is top plan view of the structure shown in FIGURE 2;

FIGURE 4 is an enlarged, fragmentary, vertical section, illustrating the driving association between the checkout counter and cart;

FIGURE 5 is a vertical, transverse section taken on the line 5—5 of FIGURE 4; and FIGURE 6 is a detail view showing a modified drive arrangement for the cart.

In general, the invention contemplates equipping a grocery cart with a movable bottom for the basket which may be set in motion to discharge goods placed thereon by pushing the cart against the end of a checkout counter to utilize the counter motive power. The cart basket will have a hinged front to permit the goods to pass out of the cart, which front will be locked against accidental movement outwardly until such time as the basket floor, or bottom, is set in motion.

Referring to the drawings in detail, there is shown a grocery cart 1 which consists of a mesh basket 2 mounted upon wheeled legs 3 and having a handle 4 by which it may be pushed around a store.

The legs 3 form supports to hold the basket at a convenient height above the floor. Each leg carries a wheel 5 as its bottom. The legs are held in proper spaced relation by horizontal transverse braces 6 and longitudinal braces 7. The legs of each side are joined at their tops by longitudinally extending side bars 8 which form the bottom rails of the sides 9 of the basket. The sides are framed by the vertical members 10 and the top rails 11. Any suitable heavy mesh 12 may be used across the frames to complete the sides. The back of the basket is bridged at the top by cross brace 13 and the back also is formed of mesh material 14. A bridge bar 15 extends between the tops of the side frames at the front to hold them properly spaced. A front panel 16, formed of a metallic frame 17 and wire mesh 18 is pivoted at its top as at 19, to the bridge bar 15 for swinging movement in a vertical plane. The front panel may be provided with rearwardly extending wings 20, if desired, to close the gap between the panel and the front side edges of the basket when the panel is swung upwardly to prevent accidental spilling of the goods.

The bottom of the basket is to be formed by the top flight of an endless belt 21. The belt is trained about rollers 22 and 23 journalled at the bottom of the corner posts, or vertical members, 10 of the basket frame. The rollers will rotate freely when the belt is moved. It will be evident that if the top flight of the belt is caused to move in a forward direction, that is, from the back toward the front of the basket, the groceries in the basket will move with the belt, swinging the front panel, or gate, outwardly and moving out of the basket.

It is important that the gate be held against outward operation except at times when the basket is to be emptied of groceries. It is also desirable that the gate open automatically when the basket is to be emptied. To these ends, the panel, or gate, is provided at one lower corner with a depending pin 24, adapted to engage a star wheel 25, mounted for free rotation on the shaft 26 of the front belt roller 22. As the gate hangs substantially centered over the roller axle, the pin 24 will rest between adjacent teeth 27 of the star wheel while extending radially toward the wheel. The pin will be unable to move forwardly or backwardly without rotation of the wheel. A pawl 28 is provided, pivoted at 29 to the roller 22, and urged by spring 30 into engagement with the teeth of the wheel. The pawl is arranged so that the wheel may rotate freely in a clockwise direction, as viewed in FIGURE 4, but will prevent counter-clockwise movement of the wheel unless the roller also moves. Thus, the panel or gate may swing backwardly freely for moving into locked position, but cannot move outwardly except when the belt, and consequently the roller 23, also move. This will ensure locking of the gate except when groceries are being delivered.

It is contemplated that the belt will be caused to rotate by utilizing the power or a checkout counter. This can be accomplished by bringing the front roller, or rather the belt as it travels around the roller, into contact with the delivery belt of the checkout counter. As the belt 31, see FIGURES 2, 3 and 4, of the checkout counter and the belt 21 of the cart must move in the same direction in order to unload the cart onto the counter belt and the counter belt carry the goods to a checking position, it is necessary that an idler be provided between the counter and cart belts. The idler may be mounted either on the counter or on the cart. In all probability, the idler will be mounted on the counter, as it will be more economical to provide a single roller for the counter than a roller for each cart.

FIGURES 2, 3 and 4 show an idler roller 32 mounted between the side plates 33 of a counter in frictional rolling contact with the belt 31 as it passes around its entrance end roller 34. A bridge plate 35 is provided, extending the width of the counter belt and overlying the idler roller to support goods moving from the cart to the counter. The bridge may have a slot 36 to accommodate the lock pin 24 on the cart gate as the gate swings outwardly.

In FIGURE 6, an idler roller 37 is shown attached to the cart. In the illustration, a bridge plate 38 having downturned side skirts 39 is mounted on the cart frame and the roller 37 is journalled in the side skirts.

In using the cart, the gate 16 will be locked in closed position by engagement of the pin 24 with the wheel 25. Even though the gate may have been swung inwardly beyond its normal locked position, it cannot swing outwardly for the pin will engage the wheel, as the gate approaches the vertical, and hold it against further movement. The gate will remain locked until the belt is rotated and, therefore, is not prone to accidental release by collision with other carts, etc. The customer will place selected groceries in the cart and, when the purchases are complete, will push the cart to the checkout counter. The cart will be moved in between the sides of the counter until the belt 21 is in contact with the idler 32 on the counter. If the idler is on the cart, the cart idler 37 will be pressed against the counter belt 31. In either event, the movement of the counter belt will cause reverse rotation of the idler, and the idler will cause the cart belt to move in the same direction as the counter belt. As the cart belt moves, its rollers 22 and 23 will move with it. As roller 22 moves, it carries the pawl 28 with it and the wheel is free to rotate. This movement will carry the lock pin 24 forwardly and release it from the wheel. The gate will then be free to swing and lift under the pressure of the goods moving out of the cart. As the goods leave the cart belt they slide over the bridge plate onto the counter belt for transport to the checker. As the gate falls back into place after the cart is empty, pin 24 will strike the teeth of the wheel 25 and rotate it to bring the pin to locked position. The wheel may move freely in this direction due to the ratchet action of the wheel and pawl.

While in the above practical embodiments of the invention have been disclosed, it will be understood that the details of construction shown and described are merely by way of example and the invention may take other forms within the scope of the appended claims.

What is claimed is:

1. A cart for collecting and transporting goods to a delivery platform having an exposed rotatable driven member, said cart comprising, a wheeled receptacle having sides and back and a front panel hinged at its top to the sides for swinging movement to form a gate for the receptacle, rollers mounted for free rotation between the sides at the front and back adjacent the bottoms of the sides, an endless belt trained about the rollers to form a floor for the receptacle, and latch means to hold the gate against outward movement, the latch being operable independently of belt movement upon inward movement of the gate to allow free inward passage of the gate to locked position and operable by movement of the belt in a receptacle unloading direction to release the gate for free outward swinging movement.

2. A cart as claimed in claim 1 wherein said latch means comprises a wheel having teeth between which a portion of the gate may engage mounted concentric to the front roller and freely rotative relative to the front roller, and a pawl pivotally mounted on the front roller and engageable with the teeth of the wheel to prevent rotation of the wheel to release the gate for outward swinging movement independently of rotation of the front roller.

3. A cart as claimed in claim 2 wherein the portion of the gate engageable with the toothed wheel comprises a pin depending from the gate.

References Cited in the file of this patent

UNITED STATES PATENTS

| | | |
|---|---|---|
| 434,582 | Corning | Aug. 19, 1890 |
| 2,338,359 | Sharp | Jan. 4, 1944 |
| 2,368,114 | Cartlidge | Jan. 30, 1945 |
| 2,409,870 | Kinnaird | Oct. 22, 1946 |
| 2,462,404 | Kahres et al. | Feb. 22, 1949 |
| 2,479,665 | Bainbridge et al. | Aug. 23, 1949 |
| 2,489,258 | Bebinger et al. | Nov. 29, 1949 |
| 2,569,711 | Foster | Oct. 2, 1951 |
| 2,972,423 | Thurnher | Feb. 21, 1961 |